(12) United States Patent
Chappell et al.

(10) Patent No.: US 7,698,064 B2
(45) Date of Patent: Apr. 13, 2010

(54) GAS SUPPORTED INERTIAL SENSOR SYSTEM AND METHOD

(75) Inventors: Charles D. Chappell, Treasure Island, FL (US); Karl H. Becker, Riverview, FL (US)

(73) Assignee: Honeywell International Inc., Morristown, NJ (US)

( * ) Notice: Subject to any disclaimer, the term of this patent is extended or adjusted under 35 U.S.C. 154(b) by 1469 days.

(21) Appl. No.: 11/004,184

(22) Filed: Dec. 3, 2004

(65) Prior Publication Data
US 2006/0058961 A1    Mar. 16, 2006

Related U.S. Application Data

(60) Provisional application No. 60/608,819, filed on Sep. 10, 2004.

(51) Int. Cl.
*G01C 21/00* (2006.01)
(52) U.S. Cl. .................. 701/220; 701/1; 701/3; 701/4; 701/5; 701/10; 701/14; 701/200; 701/207; 701/210; 701/216; 701/124; 74/572.11; 74/572.21; 74/573.1; 74/573.11; 73/1.78; 73/460; 244/3.2; 384/109; 384/114; 384/115; 384/116; 384/117; 384/118; 384/119; 384/120; 384/121; 384/122; 384/123; 384/124
(58) Field of Classification Search ................ 73/1.78, 73/460; 74/572.11, 572.21, 573.1, 573.11; 244/3.2; 384/109, 114–124; 701/124, 220
See application file for complete search history.

(56) References Cited

U.S. PATENT DOCUMENTS

| | | | |
|---|---|---|---|
| 1,315,735 A | 9/1919 | Michell | |
| 2,363,260 A | 11/1944 | Peskin | |
| 2,710,234 A | 6/1955 | Hansen | |
| 2,959,060 A | 11/1960 | Kunz | |
| 2,999,391 A | 9/1961 | Freebairn et al. | |
| 3,039,316 A | 6/1962 | Slater | |
| 3,056,303 A * | 10/1962 | Naylor | 74/5.34 |

(Continued)

FOREIGN PATENT DOCUMENTS

GB    866473    4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Khoi Tran
*Assistant Examiner*—Bhavesh V Amin
(74) *Attorney, Agent, or Firm*—Fogg & Powers LLC (57) ABSTRACT

An inertial navigation system is provided. The system includes a sensor block, an outer shell that substantially surrounds the sensor block and a plurality of gas pads connected to the outer shell that float the sensor block in gas creating a near frictionless environment to allow the sensor block to rotate in all directions. Each of the plurality of gas pads is adapted to receive pressurized gas. The outer shell and the sensor block are separated by a gap created by the pressurized gas at each pad.

22 Claims, 5 Drawing Sheets

U.S. PATENT DOCUMENTS

| | | | |
|---|---|---|---|
| 3,258,977 A | 7/1966 | Hoffman | |
| 3,269,195 A | 8/1966 | Cahoon et al. | |
| 3,328,595 A | 6/1967 | Tood, Jr. | |
| 3,365,942 A * | 1/1968 | Blazek et al. | 73/178 R |
| 3,439,546 A | 4/1969 | Baker et al. | |
| 3,572,856 A | 3/1971 | McHugh | |
| 3,576,124 A | 4/1971 | O'Connor | |
| 3,670,585 A | 6/1972 | Alexander et al. | |
| 3,769,710 A | 11/1973 | Reister | |
| 3,782,167 A | 1/1974 | Stuelpnagel | |
| 3,938,256 A | 2/1976 | Crocker, Jr. | |
| 4,003,265 A | 1/1977 | Craig et al. | |
| 4,143,466 A | 3/1979 | Quermann | |
| 4,150,579 A | 4/1979 | Vaughn | |
| 4,214,482 A | 7/1980 | Bouchard | |
| 4,244,215 A | 1/1981 | Merhav | |
| 4,290,316 A | 9/1981 | Noar et al. | |
| 4,291,926 A | 9/1981 | Tomioka et al. | |
| 4,413,864 A | 11/1983 | Phillips | |
| 4,458,426 A | 7/1984 | O'Connor et al. | |
| 4,488,041 A | 12/1984 | Baudot | |
| 4,515,486 A | 5/1985 | Ide | |
| 4,671,650 A | 6/1987 | Hirzel et al. | |
| 4,711,125 A | 12/1987 | Morrison | |
| 4,723,735 A | 2/1988 | Eisenhaure et al. | |
| 4,822,181 A | 4/1989 | Egli | |
| 4,917,330 A | 4/1990 | Dulat et al. | |
| 5,067,084 A | 11/1991 | Kau | |
| 5,088,825 A | 2/1992 | Derry et al. | |
| 5,099,430 A | 3/1992 | Hirsch | |
| 5,115,570 A | 5/1992 | Krogmann et al. | |
| 5,319,577 A | 6/1994 | Lee | |
| 5,357,437 A | 10/1994 | Polvani | |
| 5,396,326 A | 3/1995 | Knobbe et al. | |
| 5,410,232 A | 4/1995 | Lee | |
| 5,710,559 A | 1/1998 | Krogmann | |
| 5,716,142 A | 2/1998 | Kristensen et al. | |
| 5,743,654 A | 4/1998 | Ide et al. | |
| 5,745,869 A | 4/1998 | Van Bezooijen | |
| 5,790,049 A | 8/1998 | Harrell | |
| 5,894,323 A | 4/1999 | Kain et al. | |
| 6,145,393 A | 11/2000 | Canton | |
| 6,172,665 B1 | 1/2001 | Bullister | |
| 6,481,672 B1 | 11/2002 | Goodzeit et al. | |
| 6,594,623 B1 | 7/2003 | Wang et al. | |
| 6,594,911 B2 | 7/2003 | Brunstein et al. | |
| 6,629,778 B1 | 10/2003 | Enderle et al. | |
| 6,711,952 B2 | 3/2004 | Leamy et al. | |
| 6,741,209 B2 | 5/2004 | Lee | |
| 6,786,084 B2 | 9/2004 | Schroeder et al. | |
| 6,802,221 B2 | 10/2004 | Hedeen et al. | |
| 6,826,478 B2 | 11/2004 | Riewe et al. | |
| 6,918,186 B2 | 7/2005 | Ash et al. | |
| 7,003,399 B1 | 2/2006 | Chappell | |
| 7,066,653 B2 | 6/2006 | Dourlens et al. | |
| 7,340,344 B2 | 3/2008 | Chappell | |
| 2002/0077189 A1 | 6/2002 | Tuer et al. | |
| 2003/0120425 A1 | 6/2003 | Stanley et al. | |
| 2004/0015323 A1 | 1/2004 | Boyton | |
| 2004/0075737 A1 | 4/2004 | Kirby | |
| 2004/0089083 A1 | 5/2004 | Bailey | |
| 2004/0098178 A1 | 5/2004 | Brady et al. | |
| 2004/0212803 A1 | 10/2004 | Siegl et al. | |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |
| WO | 2006060715 | 6/2006 |

OTHER PUBLICATIONS

El-Sheimy et al., "Structural Monitoring Using Wirelessly Connected MEMS-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

GAS SUPPORTED INERTIAL SENSOR SYSTEM AND METHOD

CROSS REFERENCE TO RELATED CASES

This application is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, Ser. No. 11/004,517, which is incorporated herein by reference.

This application is also related to the following applications filed on even date herewith, all of which are hereby incorporated herein by reference:

U.S. patent application Ser. No. 11/004,517, entitled "GENERALIZED INERTIAL MEASUREMENT ERROR REDUCTION THROUGH MULTIPLE AXIS ROTATION DURING FLIGHT;"

U.S. patent application Ser. No 11/004,452, entitled "ARTICULATED GAS BEARING SUPPORT PADS;"

U.S. patent application Ser. No. 11/004,214, entitled "GAS JET CONTROL FOR INERTIAL MEASUREMENT UNIT;"

U.S. patent application Ser. No. 11/004,529, entitled "THREE DIMENSIONAL BALANCE ASSEMBLY;"

U.S. patent application Ser. No. 11/004,531, entitled "SPHERICAL POSITION MONITORING SYSTEM;"

U.S. patent application Ser. No. 11/004,759, entitled "ABSOLUTE POSITION DETERMINATION OF A OBJECT USING PATTERN RECOGNITION;"

U.S. patent application Ser. No. 11/004,743, entitled "PRECISE, NO-CONTACT, POSITION SENSING USING IMAGING;"

U.S. patent application Ser. No. 11/004,177, entitled "RF WIRELESS COMMUNICATION FOR DEEPLY EMBEDDED AEROSPACE SYSTEMS."

TECHNICAL FIELD

The following description relates generally to a precision inertial navigation system (INS) and particularly to an INS without gimbals.

BACKGROUND

Inertial navigation systems (INS) are used in civil and military aviation, missiles and other projectiles, submarines and space technology as well as a number of other vehicles. INSs measure the position and attitude of a vehicle by measuring the accelerations and rotations applied to the system's inertial frame. INSs are widely used because it refers to no real-world item beyond itself. It is therefore resistant to jamming and deception.

An INS may consist of an inertial measurement unit combined with control mechanisms, allowing the path of a vehicle to be controlled according to the position determined by the inertial navigation system. An inertial measurement unit contains instruments for position monitoring. Often typical INS uses a combination of accelerometers and any number of control devices.

INSs have typically used either gyrostablized platforms or 'strapdown' systems. The gyrostabilized system allows a vehicle's roll, pitch and yaw angles to be measured directly at the bearings of gimbals. The INS is traditionally rotated using electromagnetic motors on a ball bearing supported gimbal axis. A disadvantage of this scheme is that it employs multiple expensive precision mechanical parts. It also has moving parts that can wear out or jam, and is vulnerable to gimbal lock. In addition, for each degree of freedom another gimbal is required thus increasing the size and complexity of the INS. Therefore, to get complete three dimensional calibration, at least three gimbals is needed.

INSs require periodic rotation to calibrate instruments. There is a need for rotational control of INSs without the use of conventional torque motors eliminating complex parts that add weight, size and cost to the INS assembly. A traditional method of rotating an INS for calibration is to torque it about an axis using electromagnetic motors on a ball bearing supported gimbal axis. A disadvantage of this method is that it employs multiple expensive precision mechanical parts. It also has moving parts that can wear out or jam, and is vulnerable to gimbal lock. Another problem of this system is that for each degree of freedom another gimbal is required thus increasing the size of the inertial system.

INSs using ball bearing supported gimbals typically contain embedded instrumentation, such as accelerometers. In these systems, data from the instrumentation supported by the gimbals is communicated to other systems through moving contact devices, such as slip rings, which provide a constant electrical channel for data without restricting the movement of the inertial sensor assembly. However, slip rings, like ball bearing supported gimbals, are moving physical structures subject to wear and therefore represent a potential failure point for an inertial navigation system, or other system. Data signals communicated through slip rings also suffer from noise interference and low bandwidth. The embedded instrumentation also limits the full rotational capacity of the INS due to the physical constraints of the connection.

Another type of inertial navigation system is one that floats a sensor assembly with neutral buoyancy in a fluid. This method requires an extremely complex assembly, sensitive temperature control and obvious sealing challenges that add considerably to the cost of deployment and maintenance. Also, many of these fluids are hazardous or require a high degree of purity.

Inertial navigation systems which use spherical gas bearings typically require very tight tolerances on the surrounding support shell. These tight tolerances increase the cost of the system and limit the design flexibility of the system.

For the reasons stated above and for other reasons stated below which will become apparent to those skilled in the art upon reading and understanding the present specification, there is a need in the art for a guidance system which is inexpensive and easy to move in all directions for calibration without having parts that wear out or require extensive maintenance.

SUMMARY

The above-mentioned drawbacks associated with existing inertial navigation systems are addressed by embodiments of the present invention and will be understood by reading and studying the following specification.

In one embodiment, an inertial navigation system is provided. The inertial navigation system comprises a sensor block and an outer shell that substantially surrounds the sensor block. A plurality of gas pads are connected to the outer shell that float the sensor block in gas creating a near frictionless environment to allow the sensor block to move in all directions. Each of the plurality of gas pads is adapted to receive pressurized gas. The outer shell and the sensor block are separated by a gap created by the pressurized gas.

In one embodiment, a method of eliminating the use of gimbals in an inertial navigation system is provided. The method comprises surrounding a sensor block with an outer shell having a plurality of gas pads. The gas pads are adjusted inward to nearly touch the sensor block. The gas pads are pressurized so that a gas gap is formed between the sensor block and the gas pads. The sensor block floats in a near frictionless environment created by the pressurized gas.

In one embodiment, a method of calibrating sensors in an inertial navigation system is provided. The method comprises floating a sensor block containing sensors in pressurized gas creating a near frictionless environment. The sensor block is rotated in multiple directions using gas jets. Measurements are obtained from the sensors at different positions and verified against known values at the different positions. A control unit is calibrated with the measurements obtained from the sensors.

DRAWINGS

Features and advantages of the present invention will become apparent to those skilled in the art from the following description with reference to the drawings, in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide an inertial navigation system (INS) having an inertial measurement unit (IMU) floated in gas creating a near frictionless environment to allow motion in all directions. By allowing motion in all directions, complete calibration in three dimensions is possible. Further, by floating the IMU in gas the need for gimbals and ball bearings is eliminated, thereby reducing the complexity, size, and cost of the inertial navigation system. Also, by eliminating gimbals and ball bearings and other moving physical structures, there is no problem with wear on the physical structures from contact between rotating surfaces thus improving the accuracy and durability of the INS. The floated IMU is operable in strap down, one degree of freedom, two degrees of freedom, or three degrees of freedom rotation with no change in size, weight, or complexity. The degrees of freedom of motion are independent of size whereas in a gimbaled system the gimbaled system gets larger as each degree of freedom is added. An IMU operated in three degrees of freedom is calibrated three dimensionally.

Embodiments of the present invention provide the utilization of articulated gas pads to float the IMU. The gas pads allow for relaxed tolerance requirements for a surrounding support shell and easy adjustment when an IMU moves due to disturbances. Gas bearings, and more specifically air bearings, are non-contact bearings that utilize a thin film of pressurized air to provide a frictionless interface between two surfaces. The non-contact principles of an air bearing provide clear advantages over traditional bearings since problems such as wear are eliminated. The typical implementation of a spherical air bearing is to have very tight tolerances on two mating surfaces of an inner and outer sphere, with a small air gap between the two. This leads to increased cost and limits design flexibility. The articulated gas pad is an alternative that requires smaller pieces designed with closer tolerances allowing more design and adjustment flexibility in the overall air bearing as well as lower costs in machining.

Embodiments of the present invention provide IMUs or sensor blocks including one or more instruments for monitoring, angular position, acceleration, calibration and the like. The instruments are held in a sensor block that protects the instruments from vibrations, thermal problems, radiation and other things that could degrade the instruments. When sensor blocks are built the instruments are initially calibrated and then placed in the appropriate vehicle. However, if not immediately used the instruments tend to drift and become less accurate over time. For high accuracy applications the sensor block must be periodically rotated in order to recalibrate and regain higher accuracy. Recalibration is accomplished by rotating the sensor block and recording readings from the instruments at different positions and then verifying the readings against known values.

Figure 1:
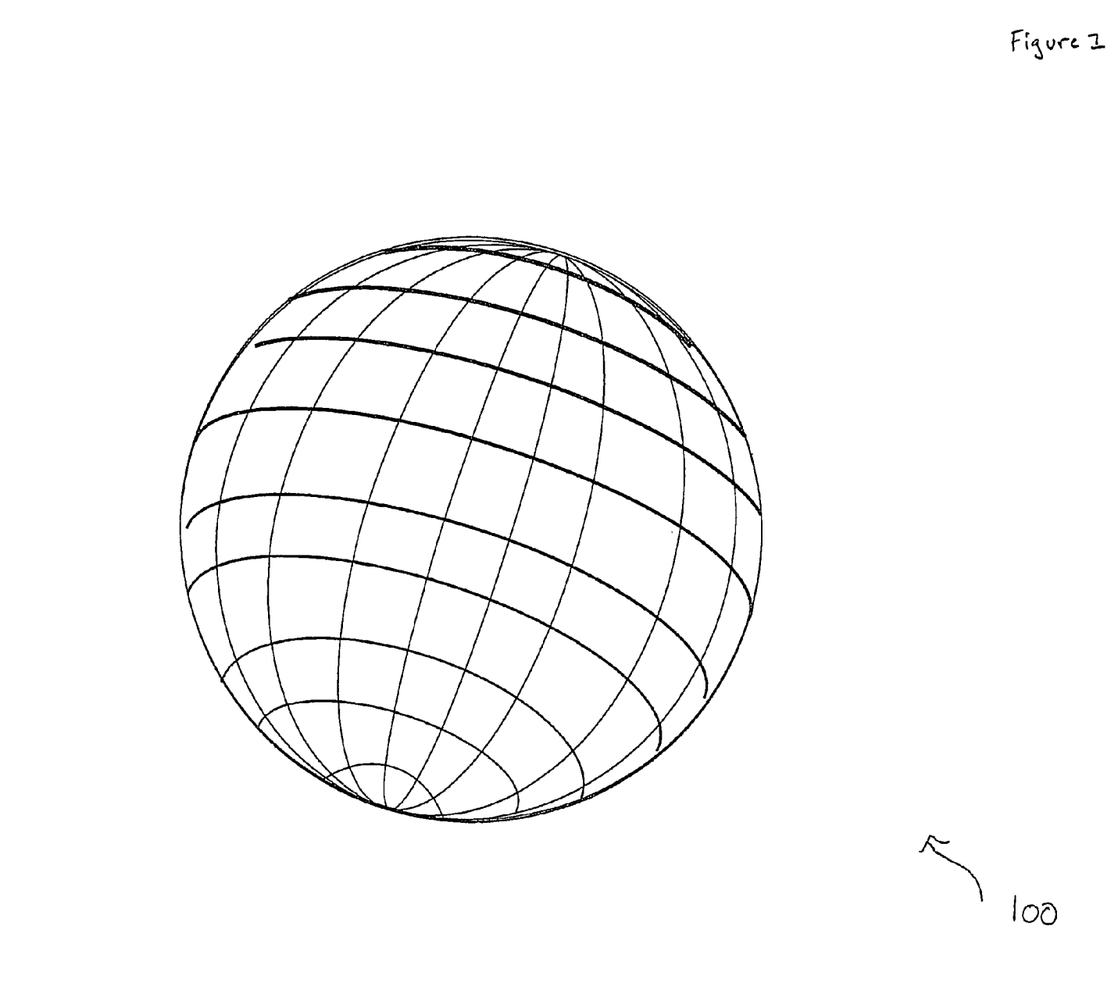
FIG. 1 is an illustration of one embodiment of a sensor block.

FIG. 1 illustrates a view of one embodiment of a sensor block, shown generally at 100. As seen in this figure, sensor block 100 is spherical in shape. The spherical shape of sensor block 100 provides easy rotation in all directions allowing calibration of sensors mounted within sensor block 100 in three dimensions. In one embodiment, calibration is accomplished by placing accelerometers in and out of earth gravity and pointing gyros in and out of earth rotation. The values measured by the instruments are compared and adjusted to match the known values of earth gravity and rotation. Other shapes for sensor block 100 such as cylinders, pyramids, and cubes are contemplated and within the scope of the invention. These other shapes however are not as easily adapted for three dimensional rotations and are more suitable for one dimensional or two dimensional rotations. In one embodiment, sensor block 100 is made of aluminum. Other materials are within the scope of the invention. In another embodiment, sensor block 100 has a machine finish and is substantially smooth on its surface. In another embodiment, sensor block 100 has positional markings such as lines visible on its exterior surface similar to longitude and latitude lines. This is used for position monitoring as described in the '7169 Application and is incorporated herein. In another embodiment, sensor block 100 has random markings, indentations, dots or the like visible on the exterior of sphere 100 for position monitoring as described in the '7167 Application incorporated herein. Indentations or protrusions on the exterior surface of sensor block 100 allow for greater torque to be produced when directing gas at the exterior surface of sensor block 100 for rotation of sensor block 100. In one embodiment, rotation is achieved using a gas jet control assembly as described in the '6535 Application incorporated herein. This allows for precise rotational control of the sensor block 100 to calibrate any internal instrumentation. In another embodiment, the diameter of sensor block 100 ranges from 8-11 inches. It is understood that any size sensor 100 is contemplated and within the scope of this invention. In operation, sensor block 100 is floated in a near frictionless environment as described in the '6475 Application and rotated for calibration using gas jets as described in the '6535 Application. Calibration is further discussed in FIG. 2 below.

Figure 2:
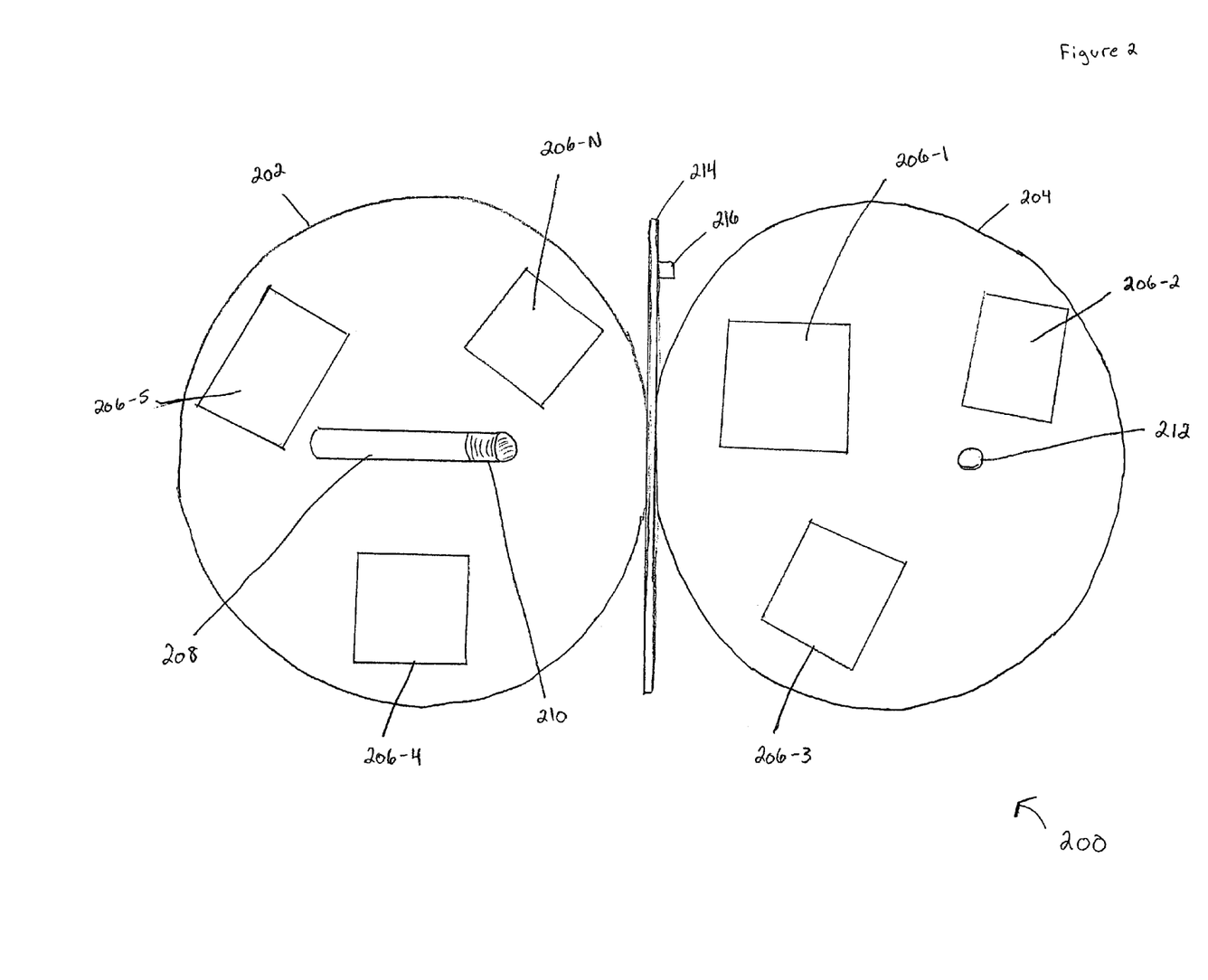
FIG. 2 is an illustration of an interior view of one embodiment of a sensor block.

FIG. 2 illustrates an interior view of one embodiment of a sensor block generally at 200. As seen in this figure, sensor block 200 is composed of a left hemisphere 202 and a right hemisphere 204. In this embodiment, left hemisphere 202 and right hemisphere 204 are substantially similar in size to form a sphere. In alternate embodiments, sensor block 200 includes two pieces that are substantially different in size to form a sphere. Sensor block 200 includes one or more sensors 206-1 to 206-N mounted within hemispheres 202 and 204. By locating the sensors 206-1 to 206-N within sensor block 200 full rotational capacity of sensor block 200 is allowed and is not constrained by devices monitoring instrumentation. In one embodiment, sensor block 200 further includes main shaft 208 that holds left hemisphere 202 and right hemisphere 204 together. In one embodiment, main shaft 208 contains a balance assembly as described in the '7914 Application incorporated herein. When left hemisphere 202 and right hemisphere 204 are combined a shape substantially spherical in nature is formed. In alternate embodiments, a shape other than a sphere is formed such as a cube, pyramid, cylinder or any other suitable shape. Sensor block 200 further includes a divider disk 214 coupled to both the left and right hemispheres 202 and 204. In one embodiment, divider disk 214 is a circuit board and includes one or more electronic components 216 mounted on it. In alternate embodiments, divider disk 214 contains no electronic components 216. In alternate embodiments, sensor block 200 does not include a divider disk 214 and any electronics are mounted at other locations within sensor block 200.

In operation, sensor block 200 is floated in a near frictionless environment as described in the '6475 Application. Sensors 206 are rotated for calibration using gas jets as described in the '6535 Application. In one embodiment, sensors 206 are accelerometers. Accelerometers when pointed horizontally show a G force of zero, and when pointed upwards they show a G force of 1 and when pointed downwards they show a G force of −1. The sensor block 200 is rotated so that the accelerometers point in these aforementioned directions and the readings from the accelerometers are recorded. If the accelerometer is not reading the known value for the different directions, a computer or other control unit can be calibrated to make it read the appropriate value. Rotation can be done once a week, once a day or whenever is necessary depending on the accuracy needed.

Figure 3:
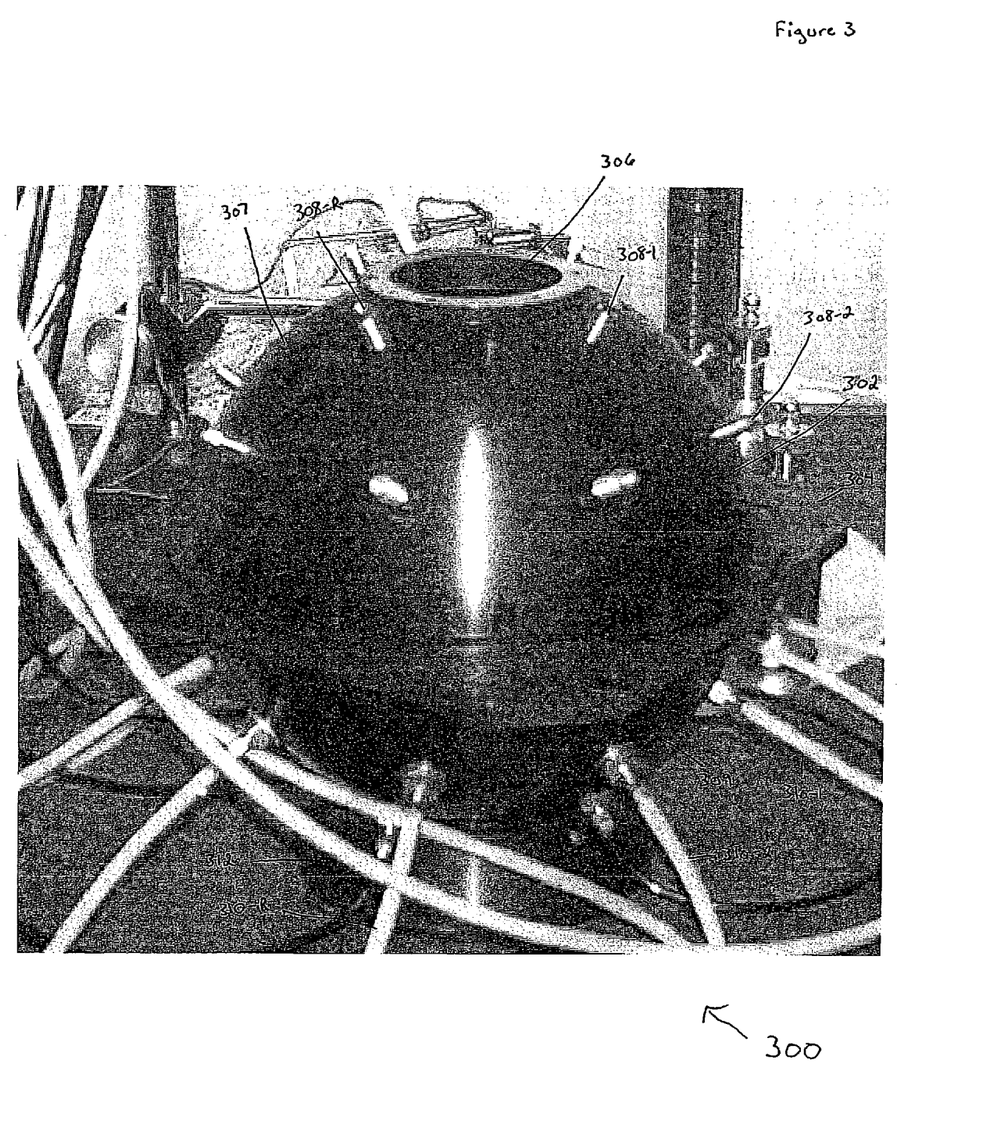
FIG. 3 is an illustration of a view of one embodiment of an inertial navigation system.

FIG. 3 is an illustration of one embodiment of an INS of the present invention, shown generally at 300. INS 300 includes an outer shell 302 that surrounds a sensor block (not visible). In one embodiment, sensor block is as described in FIG. 1 above. In another embodiment, the sensor block is as described in FIG. 2 above. Outer shell 302 is composed of a first half shell 307 and a second half shell 309. Half shells 307, 309 fasten to a mid plate 304. In one embodiment, half shells 3307, 309 are fastened to mid plate 304 by any appropriate fasteners such as bolts, screws, rivets, or the like. In one embodiment, mid plate 304 includes gas jet assemblies as described in '6535 Application and incorporated herein. Once assembled, the inner surface of outer shell 302 fastened to mid plate 304 is substantially spherical in shape. In alternate embodiments, the interior surface of outer shell 302 is in the shape of a pyramid, cube or a cylinder. Other shapes are contemplated and within the scope of the invention. In one embodiment, first half shell 307 has a first opening 306 and second half shell 309 has a corresponding second opening (not visible). In another embodiment, second half shell 309 does not have an opening. First opening 306 allows gas to exit from inside the outer shell 302 which is further explained with respect to FIG. 5 below. In alternate embodiments, first opening 306 allows for position monitoring devices such as those described in the '7057 Application incorporated herein.

In one embodiment, outer shell 302 is adapted to receive a plurality of gas pads 308. In this figure only the mounting stem portion of gas pads 308 as described in the '6475 Application is shown and hereinafter will be referred to only as gas pads 308. Gas pads 308 are spaced around the outer shell 302 and are used to suspend an inner sensor block (not visible) in a near frictionless environment as described in FIG. 1 of the '6475 Application incorporated herein. In one embodiment gas pads 308 are adapted to be received into threaded holes in outer shell 302. In this embodiment, the visible mounting stems of gas pads 308-1 through 308-R are adapted to receive gas hoses 310-1 through 310-R. In one embodiment, gas hoses 310 receive gas from pneumatic valves (not shown). In one embodiment, there is a gap between the sensor block (not visible) and the outer shell 302 that is approximately 0.5 inches. Other gap sizes are contemplated and within the scope of the invention. In one embodiment of the present invention, outer shell 302 rests on a support fixture 312. In one embodiment, support fixture 312 contains a gas jet assembly as described in the '6535 Application.

In operation, gas is supplied to gas hoses 310 that are connected to the mounting stem portion of gas pads 308 as described in the '6475 Application. A sensor block (not visible) inside outer shell 302 is floated in a near frictionless environment. In one embodiment, the sensor block contains sensors 206 as described in FIG. 2 above and is rotated for calibration using gas jets as described in the '6535 Application. In one embodiment, calibration is performed as described in FIG. 2.

Figure 4:
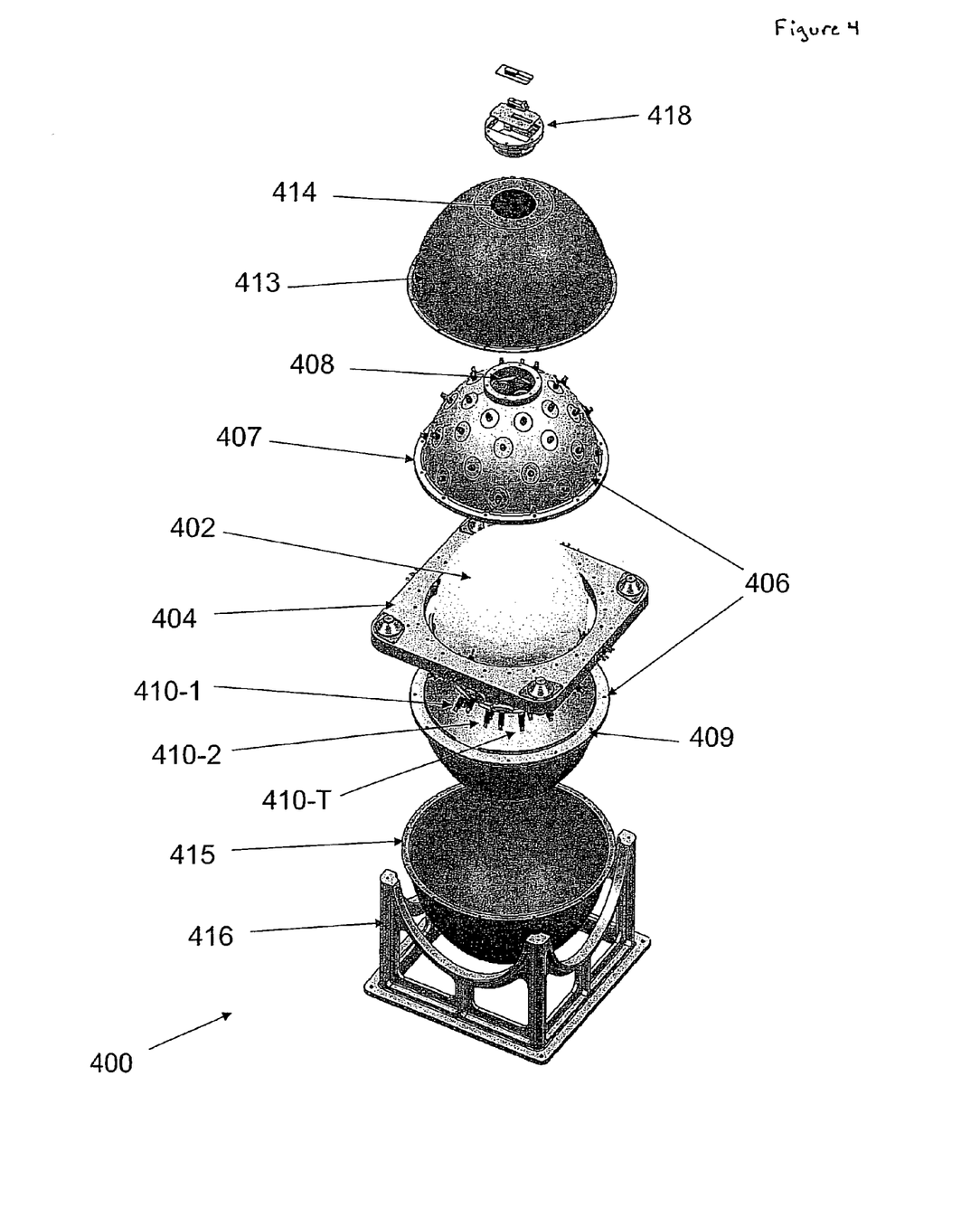
FIG. 4 is an illustration of a view of another embodiment of an inertial navigation system.

FIG. 4 illustrates another embodiment of an INS shown generally at 400. INS 400 is comprised of a sensor block 402 which is surrounded by a mid plate 404. In one embodiment, mid plate 404 contains gas jet assemblies as described in the '6535 Application. An outer shell 406 comprising a first half shell 407 and a second half shell 409 is designed to surround sensor block 402 and fasten to mid plate 404 to create a gap between sensor block 402 and outer shell 406. In one embodiment, outer shell 406 is adapted to receive a plurality of gas pads 410-1 to 410-T. In one embodiment, gas pads 410 are spaced around outer shell 406 and are used to suspend sensor block 402 as described in the '6475 Application incorporated herein. In one embodiment, gas pads 410 are adapted to be received into threaded holes in outer shell 406. In this embodiment, gas pads 410-1 to 410-T are evenly spaced around first half shell 407 and second half shell 409. In one embodiment, outer shell 406 is surrounded by a first pressurized gas plenum 413 and a second pressurized gas plenum 415 which supply gas to gas pads 410.

In one embodiment, first gas plenum 413 and second gas plenum 415 are used to reduce the use of individual hoses to each gas pad 410. In one embodiment, first gas plenum 413 and second gas plenum 415 are used to distribute a pressurized gas evenly to a group of gas pads 410. In one embodiment, multiple gas plenums are used depending on the specific design details to cover one or more gas pads 410. In this embodiment, first gas plenum 413 has an opening 414 to receive pressurized gas. In this embodiment, first gas plenum 413 is adapted to fit over first half shell 407 and second gas plenum 415 is adapted to fit over second half shell 409. In one embodiment, first gas plenum 413 has a different operating gas pressure than second gas plenum 415. In an alternate embodiment, both first gas plenum 413 and second gas plenum 415 provide radiation shielding to INS 400. Radiation shielding is beneficial in protecting internal instruments and electronics from various kinds and levels of radiation. In another embodiment, second gas plenum 415 fits inside a support fixture 416. In one embodiment, support fixture 416 is fastened to mid plate 404 by any appropriate fasteners such as bolts, screws, rivets, or the like. In another embodiment, first half shell 407 has an opening 408 that corresponds to opening 414 located in first gas plenum 413. In another embodiment, openings 408 and 414 allow for pressurized gas to be received by INS 400. In one embodiment, openings 408 and 414 allow for position monitoring devices such as 418 to monitor rotation and position of sensor block 402. In one embodiment, the position monitoring device is as described in the '7057 Application incorporated herein. In operation, pressurized gas from gas plenums 413 and 415 is supplied to gas pads 410-1 to 410-T which pressurize the gap between gas pads 410-1 to 410-T and sensor block 402 causing sensor block 402 to float in the gas creating a near frictionless environment free of any physical contact. Sensors (not visible), as described in FIG. 2 above, mounted within sensor block 402 are calibrated by rotating sensor block 402 using gas jet assemblies located in mid plate 404. In alternate embodiments, gas jet assemblies are located as described in the '6535 Application. Sensor block 402 is rotatable freely in all directions. In one embodiment, the movement of sensor block 402 is monitored by position monitoring devices 418 and properly adjusted using gas jet assemblies.

Figure 5:
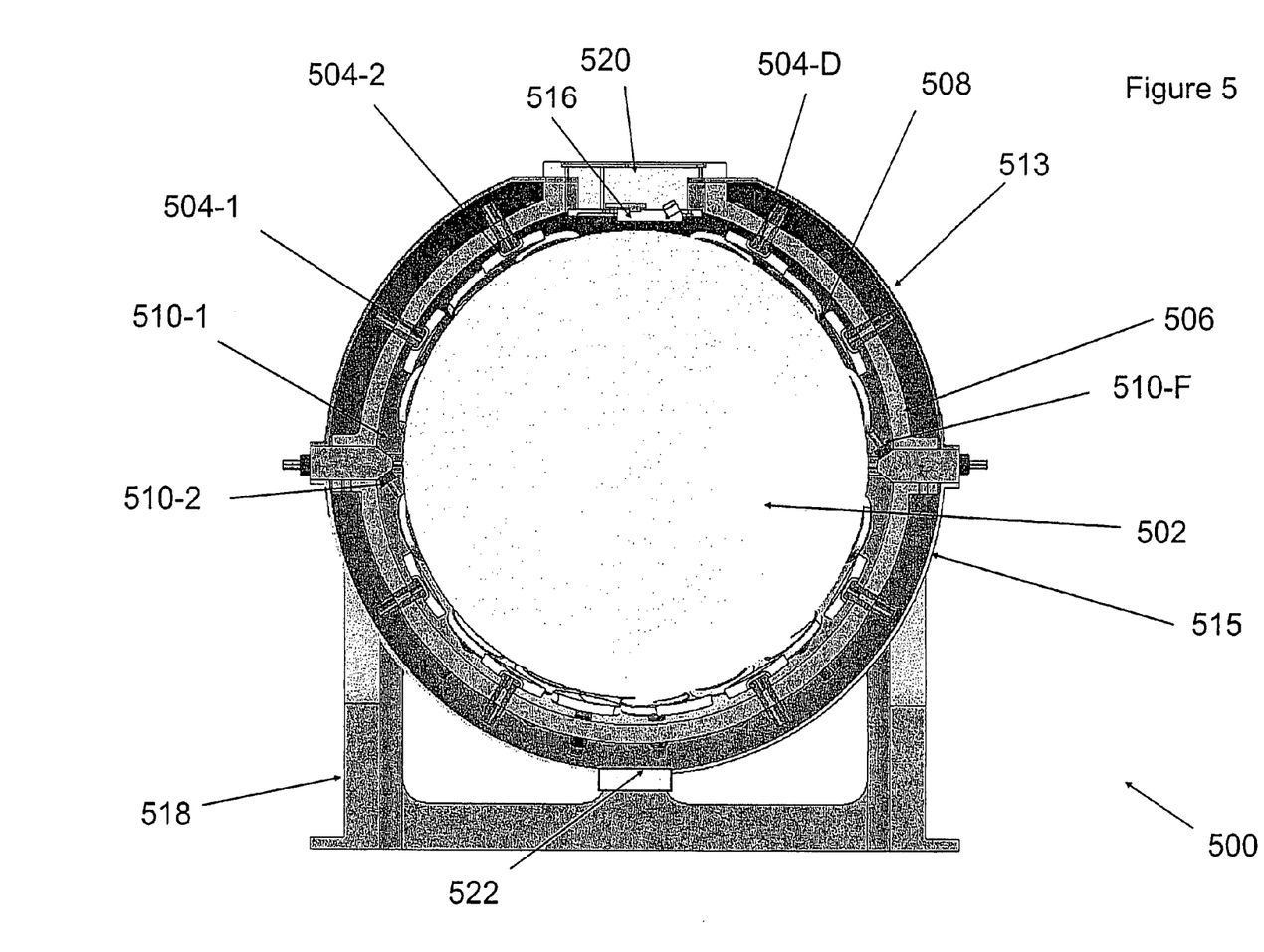
FIG. 5 is an illustration of cut away view of one embodiment of an inertial navigation system.

FIG. 5 illustrates a cut away view of one embodiment of an INS shown generally at 500. INS 500 is comprised of a sensor block 502 which is substantially spherical in shape. In one embodiment, sensor block 502 contains sensors (not visible) as described in FIG. 2 above. Sensor block 502 is surrounded by gas pads 504-1 to 504-D that are adapted to be received by outer shell 506 and held securely in place. In this embodiment, the interior surface of outer shell 506 is substantially spherical in shape. In alternate embodiments, the interior surface of outer shell 506 is a cylinder, a pyramid, a cube or any polygon suited for encapsulating sensor block 502 and allowing for suspension and rotation of sensor block 502. A gap 508 between gas pads 504 and sensor block 502 is formed and is filled with pressurized gas allowing sensor block 502 to be freely suspended in gas with no external physical contact with other structures. This allows sensor block 502 to rotate in all directions for easy calibration of internal instrumentation. In this embodiment, gas pads 504-1 to 504-D are substantially equally spaced around sensor block 502 in order to center sensor block 502 with respect to outer shell 506. In one embodiment, this is done as described in the '6475 Application. In one embodiment, sensor block 502 is rotated using gas jets 510 as described in the '6535 Application. In this embodiment, gas jets 510-1 to 510-F are positioned at the mid plane of the sensor block 502 and provide for three dimensional rotation. In one embodiment, a pressurized first gas plenum 513 and a pressurized second gas plenum 515 supply gas to gas pads 504. In this embodiment, first gas plenum 513 and second gas plenum 515 surround the outer shell 506 as described in FIG. 4. First gas plenum 513 and second gas plenum 515 have a first opening 520 and a second opening 522 respectively which allows gas to exit the INS. First opening 520 corresponds to an opening 516 in the outer shell 506. In operation, pressurized gas in gas plenums 513 and 515 is supplied to gas pads 504 and fills the gap 508, between gas pads 504 and sensor block 502, and suspends the sensor block 502 in a near frictionless environment. In one embodiment, pressurized gas is released through opening 516 of outer shell 506 and out through first opening 520 of first gas plenum 513 to exit INS 500. In one embodiment, gas is also released through second opening 522 of second gas plenum 515. In an alternate embodiment, gas is recirculated in a closed loop environment. In operation, the close loop environment is performed by capturing gas that exits from the gap 508 surrounding the sensor block 502. The gas can be routed to a heat exchanger (not shown) and pump (not shown) to be reused in a closed system. This allows the system to operate in a vacuum environment for an extended period of time by reuse of the self-contained gas. The thermal properties of the gas can be controlled by the heat exchanger in terms of adding or rejecting heat from the gas. In one embodiment, support fixture 518 prevents INS 500 from moving. In one embodiment support fixture 518 is as described in FIG. 3. In one embodiment, support fixture 518 is as described in FIG. 4.

In operation, INS 500 is adapted to be mounted in aircraft, missiles and other projectiles, submarines and space technology as well as a number of other vehicles. Sensor block 502 measures the position and attitude of the vehicle in which it is mounted by measuring the accelerations and rotations applied to the system's inertial frame. Sensor block 502 is adapted to rotate freely in a near frictionless environment allowing for easy rotation and calibration. In one embodiment, calibration is performed as described in FIG. 2.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An inertial navigation system, the system comprising:
  a sensor block;
  an outer shell having a first half shell and a second half shell;
  a mid plate;
  wherein the first half shell and the second half shell of the outer shell mate with the mid plate and substantially surround the sensor block;
  a plurality of gas pads connected to the outer shell that suspend the sensor block in gas creating a near frictionless environment to allow the sensor block to move to any angular position;
  a first gas plenum that substantially surrounds the first half shell;
  a second gas plenum that substantially surrounds the second half shell; and
  a plurality of gas jets for applying a torque to the sensor block;
  wherein the first gas plenum and the second gas plenum mate with the mid plate and substantially surrounds the outer shell;
  wherein each of the plurality of gas pads is adapted to receive pressurized gas;
  wherein the outer shell and the sensor block are separated by a gap created by the pressurized gas.

2. The system of claim 1, wherein the sensor block is in the shape of a sphere.

3. The system of claim 1, wherein the sensor block's surface is substantially smooth.

4. The system of claim 1, wherein the sensor block's surface is rough.

5. The system of claim 1, wherein the sensor block is composed of a first section and a second section held together by a main shaft.

6. The system of claim 5, wherein the first section and second section are substantially equal in size.

7. The system of claim 5, wherein the main shaft contains a balance assembly.

8. The system of claim 5, wherein the sensor block includes a circuit board.

9. The system of claim 8, wherein the circuit board contains electronic components.

10. The system of claim 1, wherein the sensor block is made out of aluminum.

11. The system of claim 1, wherein the sensor block has positional markings on an exterior surface of the sensor block.

12. The system of claim 1, wherein the gas used is air.

13. The system of claim 1, wherein the gas used is nitrogen.

14. The system of claim 1, wherein an interior surface of the outer shell is substantially spherical.

15. The system of claim 1, wherein the sensor block contains one or more sensors.

16. The system of claim 15, wherein at least one of the one or more sensors is an accelerometer.

17. The system of claim 15, wherein the sensor block protects the sensors from one or more of vibration, thermal effects, and radiation.

18. The system of claim 1, wherein the gas pads receive pressurized gas from the first and second gas plenums.

19. The system of claim 1, wherein the first and second gas plenums are operated at different gas pressures.

20. The system of claim 1, wherein the sensor block is rotated using gas jets.

21. A method of eliminating the use of gimbals in an inertial navigation system, the method comprising:
    surrounding a sensor block with an outer shell having a plurality of gas pads;
    adjusting the gas pads inward to nearly touch the sensor block;
    pressurizing the gas pads so that a gas gap is formed between the sensor block and the gas pads; and
    calibrating the sensor block by applying a torque to the sensor block using a plurality of gas jets;
    wherein the sensor block is suspended in a near frictionless environment created by the pressurized gas.

22. The method of claim 20, further comprising:
    rotating the sensor block in any location without physically contacting the sensor block.

* * * * *